United States Patent
Browning et al.

(10) Patent No.: US 10,146,779 B2
(45) Date of Patent: Dec. 4, 2018

(54) OUTPUTTING MAP-REDUCE JOBS TO AN ARCHIVE FILE

(71) Applicant: International Business Machines Corporation, Armonk, NY (US)

(72) Inventors: Curtis N. Browning, Atascadero, CA (US); Niall F. McCarroll, Wokingham (GB)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 14/752,137

(22) Filed: Jun. 26, 2015

(65) Prior Publication Data
US 2016/0070711 A1    Mar. 10, 2016

(30) Foreign Application Priority Data
Sep. 10, 2014 (GB) .................................. 1416018.8

(51) Int. Cl.
*G06F 17/30* (2006.01)

(52) U.S. Cl.
CPC .. *G06F 17/30073* (2013.01); *G06F 17/30194* (2013.01); *G06F 17/30227* (2013.01)

(58) Field of Classification Search
CPC ............................................... G06F 17/30073
See application file for complete search history.

(56) References Cited

U.S. PATENT DOCUMENTS

| 6,823,356 | B1 * | 11/2004 | Novaes | G06F 9/466 |
| | | | | 707/999.008 |
| 7,447,713 | B1 | 11/2008 | Berkheimer | |
| 2004/0068516 | A1 * | 4/2004 | Lee | G06F 17/30194 |
| 2011/0276962 | A1 | 11/2011 | Chambers et al. | |
| 2012/0101991 | A1 | 4/2012 | Srivas et al. | |
| 2013/0332612 | A1 | 12/2013 | Cai et al. | |

(Continued)

FOREIGN PATENT DOCUMENTS

GB    2530052 A    3/2016

OTHER PUBLICATIONS

Apache, "Welcome to Apache HBase™," Apache HBase Home, Last Updated on Apr. 27, 2015, p. 1-2, Version: 2.0.0—SNAPSHOT, The Apache Software Foundation, http://hbase.apache.org/, Accessed on Jun. 14, 2015.

(Continued)

*Primary Examiner* — Etienne P Leroux
*Assistant Examiner* — Dara J Glasser
(74) *Attorney, Agent, or Firm* — Patricia B. Feighan

(57) ABSTRACT

Method and system are provided for writing output from map-reduce jobs to an archive file. The method may include providing an archive manager and exposing an interface to be called from map-reduce jobs to output to an archive file in a map-reduce distributed file system. The method may also include using a buffering database as a temporary cache to buffer updates to the archive file. Handling by the archive manager calls from map-reduce jobs may allow: reading directly from an archive file or from a job index at the buffering database; writing to a job index at the buffering database used as a temporary cache to buffer updates; and serializing updates from the buffering database to the archive file.

18 Claims, 10 Drawing Sheets

(56) References Cited

U.S. PATENT DOCUMENTS

2014/0067820 A1\* 3/2014 Wilkins ............ G06F 17/30194
707/741
2014/0108723 A1\* 4/2014 Nowoczynski ..... G06F 12/0866
711/113

OTHER PUBLICATIONS

Browning et al., "Outputting Map-Reduce Jobs to an Archive File," Filed on Sep. 10, 2014, p. 1-34, GB Patent Application Serial No. GB1416018.8.
UK Intellectual Property Office, "Search Report under Section 17," dated Dec. 11, 2014, 3 Pages, International Application No. GB1416018.8.

\* cited by examiner

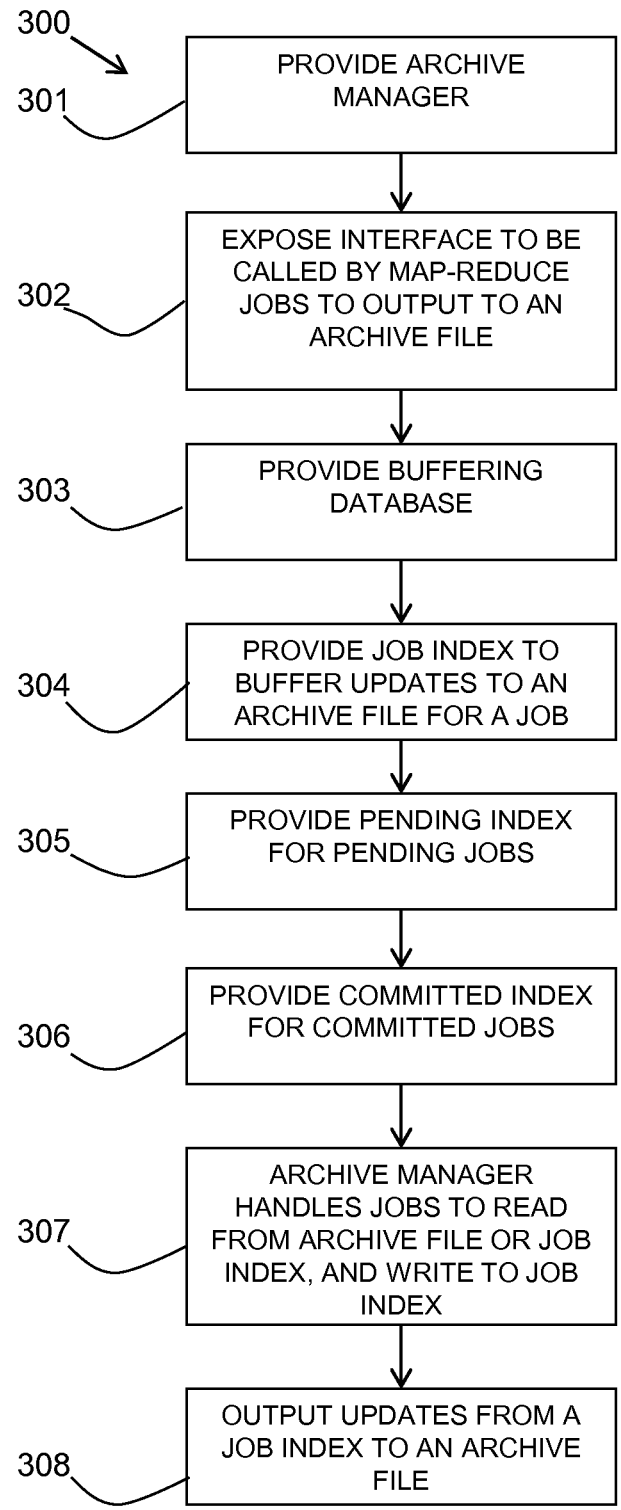

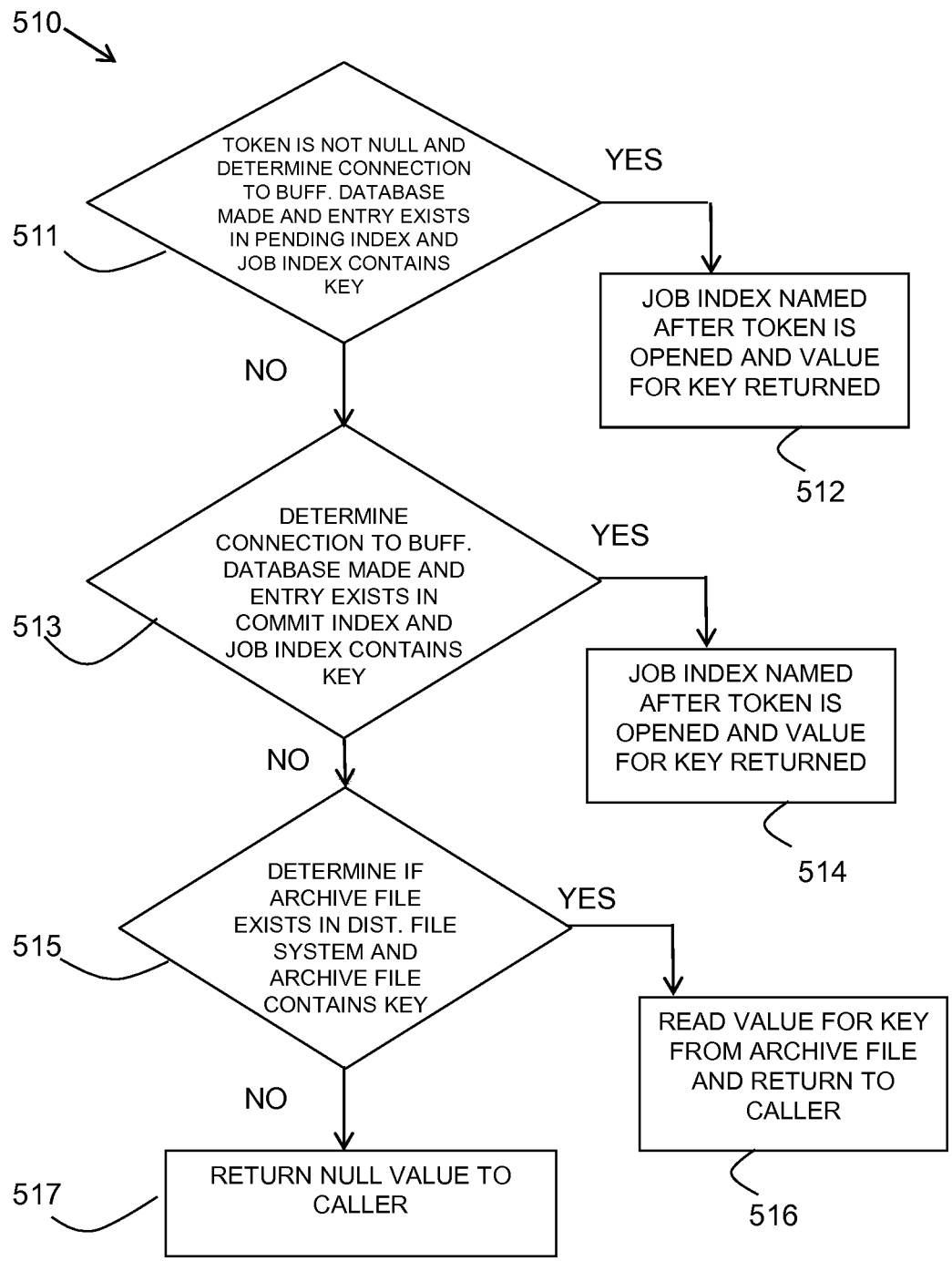

OUTPUTTING MAP-REDUCE JOBS TO AN ARCHIVE FILE

BACKGROUND

This invention relates to the field of map-reduce jobs. In particular, the invention relates to outputting map-reduce jobs to an archive file.

Map-reduce frameworks such as Apache's Hadoop (Apache and Hadoop are trademarks of The Apache Software Foundation) are well suited to reading and writing large quantities of data, using a cluster of machines to run map-reduce jobs, process the data, and provide a distributed file system to store data files. Map-reduce frameworks are designed to be able to scale to process more data without slowing performance. This is achieved by adding machines on which to run in parallel more instances of map or reduce tasks which can process the data in parallel.

Although distributed file systems allow map-reduce tasks to efficiently perform concurrent reads on a single file opened on the distributed file system, it is not possible for multiple map-reduce tasks running within a map-reduce job to concurrently update a single file stored on the distributed file system. For example, it is not possible for a map-reduce task to lock a region of a distributed file system file to update it.

A consequence of this is that it is difficult for a map-reduce job to be able to scale well and store results into a single output archive file (for example, a zip formatted file) that is portable and can easily be read by a wide variety of applications.

In data mining, there is just such a use case for building a "split" model on a big dataset, where the split model consists of an archive that consists of 100s of thousands or even millions of individual model files.

Typical approaches used in known map-reduce frameworks for scalable output are to: (i) store results in a distributed database system such as a NoSQL (Not Only Structured Query Language) database, which allows concurrent update; or (ii) spread the output across multiple distributed file system files (where each map-reduce task writes a separate file). However, neither of these techniques outputs a single archive file which is easy for other applications to consume.

SUMMARY

According to a first aspect of the present invention a method for outputting map-reduce jobs to an archive file is provided. The method may include providing an archive manager and exposing an interface to be called from map-reduce jobs to output to an archive file in a map-reduce distributed file system The method may also include using a buffering database as a temporary cache to buffer updates to the archive file. The method may further include handling by the archive manager calls from map-reduce jobs to allow: reading directly from an archive file or from a job index in the buffering database. The method may additionally include writing to a job index in the buffering database used as a temporary cache to buffer updates. The method may include outputting updates from a job index to an archive file.

In further features, handling by the archive manager calls from map-reduce jobs may include: receiving a read call for a task of a map-reduce job; connecting to the buffering database; looking up a unique token for a map-reduce job at a pending index and a committed index provided at the buffering database; depending on the status of the job, either reading from the archive file or reading from a job index provided at the buffering database.

In further features, handling by the archive manager calls from map-reduce jobs may include: receiving a write call for a task of a map-reduce job; connecting to the buffering database; looking up a unique token for a map-reduce job at a pending index provided at the buffering database; writing to a job index provided at the buffering database.

The archive manager may manage access to the archive file, including: allowing only one map-reduce job to open an archive file for writing updates at a time and committing the updates on completion of a job; allowing reading from the archive file by all jobs but without allowing reading of uncommitted writes.

The method may include: maintaining a pending index at the buffering database to be accessed by a map-reduce job, whereby the pending index includes keys of archive file paths and values of unique tokens, whereby a unique token is allocated to a map-reduce job that has opened the archive file for writing; the pending index including entries for archive files containing uncommitted updates buffered in the buffering database.

The method may further include: maintaining a committed index at the buffering database to be accessed by a map-reduce job, whereby the committed index includes keys of archive file paths and values of unique tokens, whereby a unique token is allocated to a map-reduce job that has opened the archive file for writing; the committed index including entries for archive files for which updates have been committed but not yet serialized to the archive file.

The method may include serializing any committed updates buffered in the buffering database to the archive file, including mapping an archive file path name and a job index containing updates to an archive file.

Handling calls from map-reduce jobs by the archive manager may include a map-reduce job for opening an archive file for writing including: connecting to the buffering database; creating a new unique token for the job and associating it with a path to an archive file; creating a job index at the buffering database for the archive file to buffer updates to the archive file.

Handling calls from map-reduce jobs by the archive manager may include a map-reduce job for committing changes to an archive file including: connecting to the buffering database; creating a serializing job to serialize updates buffered in the job index at the buffering database, to the archive file; moving the entry for the archive path and unique job token to the committed index at the buffering database.

Handling calls from map-reduce jobs by the archive manager may include a map-reduce job for rollback of changes to an archive file including: connecting to the buffering database; removing an entry for the archive path and unique job token from the pending index at the buffering database.

According to a second aspect of the present invention there is provided a system for outputting map-reduce jobs to an archive file, including: an archive manager including an interface to be called from map-reduce jobs to output to an archive file in a map-reduce distributed file system; a buffering database providing a temporary cache to buffer updates to the archive file; whereby the archive manager handles calls from map-reduce jobs to: read directly from an archive file or from a job index at the buffering database; write to a job index at the buffering database used as a temporary cache to buffer updates; and a serializing component for outputting updates from a job index to an archive file.

The buffering database may include a job index to buffer updates to an archive file for a job, and whereby the name of the job index is a unique token of the updating job.

The system may include: maintaining a pending index at the buffering database to be accessed by a map-reduce job, whereby the pending index includes keys of archive file paths and values of unique tokens, whereby a unique token is allocated to a map-reduce job that has opened the archive file for writing; the pending index including entries for archive files containing uncommitted updates buffered in the buffering database.

The system may include: maintaining a committed index at the buffering database to be accessed by a map-reduce job, whereby the committed index includes keys of archive file paths and values of unique tokens, whereby a unique token is allocated to a map-reduce job that has opened the archive file for writing; the committed index including entries for archive files for which updates have been committed but not yet serialized to the archive file.

The system may include a serializing component for serializing any committed updates buffered in the buffering database to the archive file, including mapping an archive file path name and a job index containing updates to an archive file.

According to a third aspect of the present invention there is provided a computer program stored on a computer readable medium and loadable into the internal memory of a digital computer, comprising software code portions, when said program is run on a computer, for performing the method steps of the first aspect of the present invention.

According to a fourth aspect of the present invention there is provided a method substantially as described with reference to the figures.

According to a fifth aspect of the present invention there is provided a system substantially as described with reference to the figures.

The described aspects of the invention provide the advantage of enabling map-reduce jobs to output to or update a single archive file without sacrificing scalability.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which:

FIG. 3 is a flow diagram of an example embodiment of a method in accordance with the present invention;

FIGS. 5A and 5B are flow diagrams of further aspects of an example embodiment of a method in accordance with the present invention;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are provided for enabling map-reduce jobs to output to or update a single archive file without sacrificing scalability. Typically the archive file may be a zip formatted file, but other formats may be used.

Figure 1:
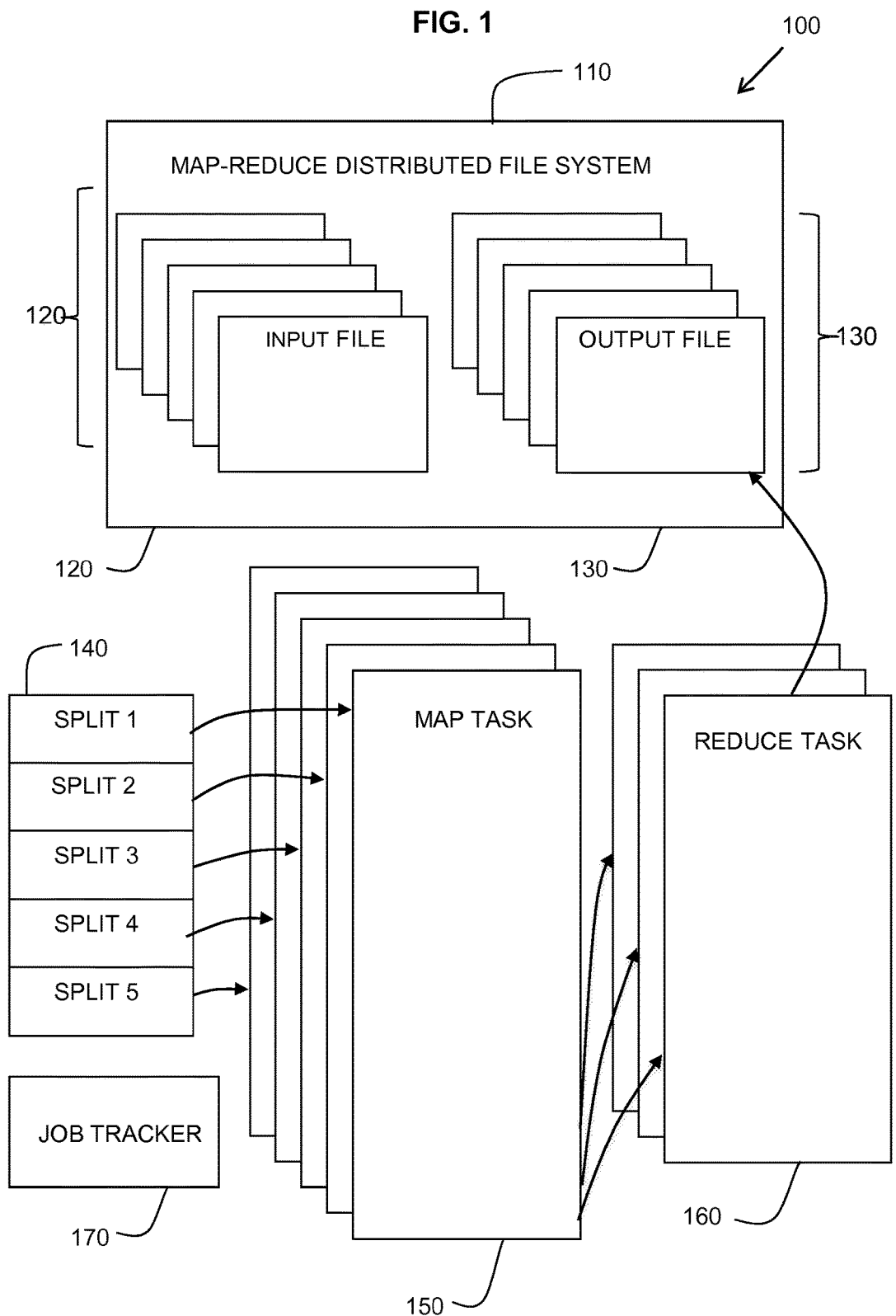
FIG. 1 is a schematic diagram illustrating map-reduce framework in which the present invention may be implemented.

Referring to FIG. 1, an example map-reduce system 100 is shown. A map-reduce system 100 coordinates the processing of distributed servers, running various tasks in parallel and manages communications and data transfers between the components of the system. Map-reduce systems processes and generates large data sets with a parallel, distributed algorithm on a cluster. The "map" procedure performs filtering and sorting, and the "reduce" procedure performs a summary operation.

FIG. 1 shows a map-reduce distributed file system 110 in which a plurality of input files 120 and a plurality of output files 130 are shown. The map-reduce system 100 splits input files 120 into splits 140 which are each mapped to map tasks 150. The output of the map tasks 150 are forwarded to reduce tasks 160 from which they are output to the output files 130. A job tracker 170 may track the jobs and their individual tasks.

Figure 2:
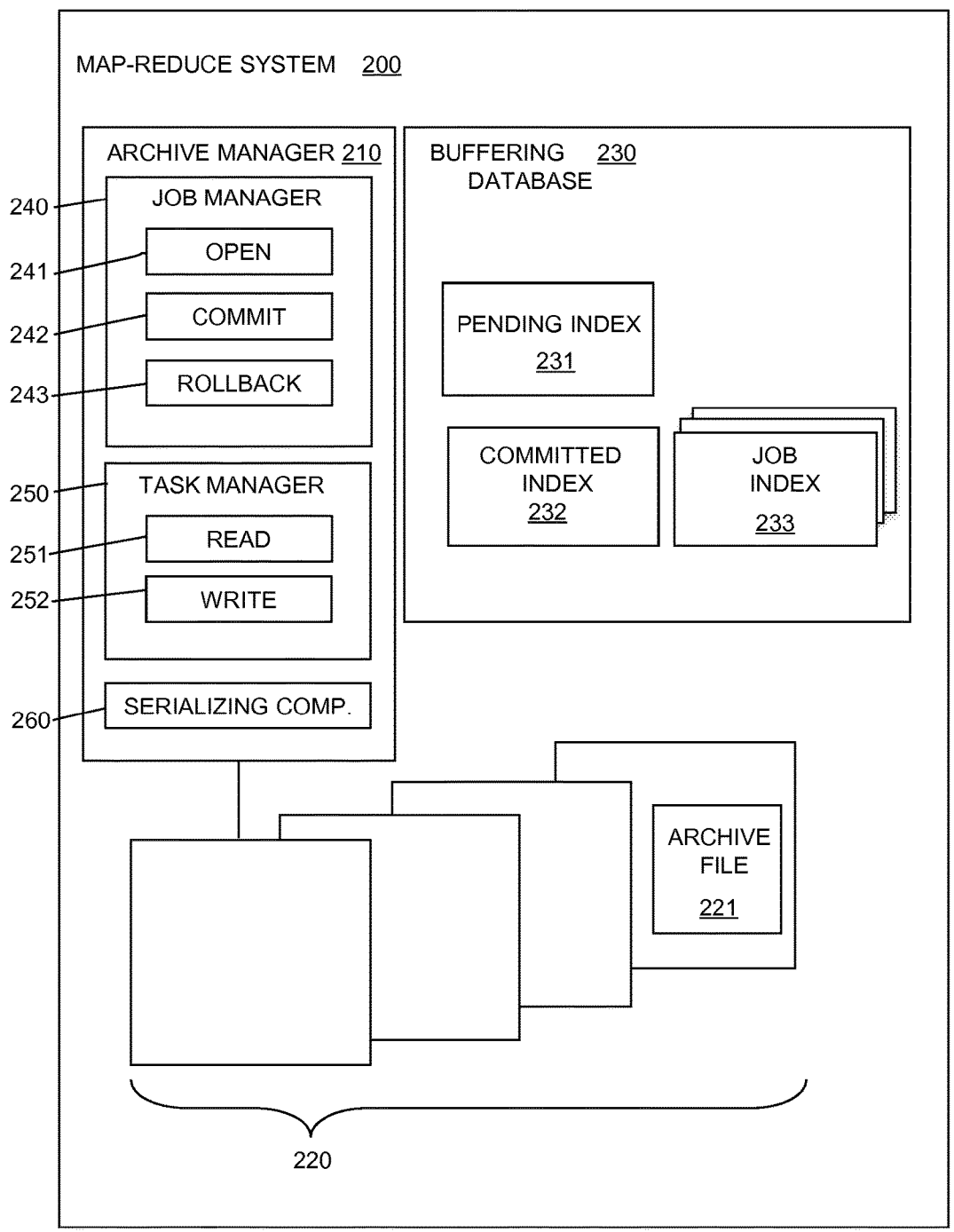
FIG. 2 is a block diagram of an example embodiment of a system in accordance with the present invention.

Referring to FIG. 2, an example embodiment of the described system is shown. A map-reduce system 200 is provided which includes an archive manager 210 for outputting map-reduce jobs to an archive file 221 providing in the map-reduce system's distributed file system 220.

The system includes a buffering database 230 providing a temporary cache to buffer updates that have not yet been written to the archive file 221. The buffering database 230 includes job indexes 233 for indexing buffered updates to the archive file 221 for jobs. The buffering database 230 includes a pending index 231 and a committed index 232 for indexing jobs.

The archive manager 210 may be provided as a library, for example, implemented as a packaged file format such as a Java .jar file (Java is a trade mark of Sun Microsystems). The archive manager 210 may expose an application programming interface (API) which can be called from map-reduce jobs to read and write an archive file 221.

The archive manager 210 handles calls from map-reduce tasks, by a combination of reading directly from the archive file 221 and reading and writing to the buffering database 230. The buffering database 230 may be a Not Only Structured Query Language (NoSQL) database (for example, the HBase database).

The archive manager 210 includes a job manager 240 for handling job operations to an archive file 221 via the buffering database 230. The job manager 240 includes components to handle a call to the "job open" operation 241 for opening the archive 221 for writing, "job commit" operation 242 for committing changes to the archive file 221, and "job rollback" operation 243 for rollback changes to the archive file 221. The archive manager 210 also includes a task manager 250 for handing read task operations 251 and write task operations 252 which can be called by map-reduce tasks running within a job to read and write to archive file 221 while the job is running.

The archive manager 210 includes a serializing component 260 for mapping between the buffering database 230 and the archive file 221.

Access to the archive file 221 is managed by the archive manager 210 so that only one job can open the archive file 221 for writing at a time. Other jobs can read from an archive file 221 but do not see uncommitted updates.

A job that has opened the archive file 221 for write access can concurrently write updates to the archive file 221 from multiple map-reduce tasks that are part of the job.

Once a job ends, the updates are committed and are immediately visible to other jobs which use the archive manager 210 to read from the archive file 221. Serialization of updates to the archive file 221 may take longer but the archive file 221 will eventually be consistent.

The buffering database 230 which buffers updates must be running for an archive file 221 to be updated via the buffering archive manager 210, but is not required when jobs simply read from the archive file 221 via the buffering archive manager 210.

Referring to FIG. 3, a flow diagram shows a flow diagram 300 of an example embodiment of the described method.

An archive manager is provided 301 and exposes 302 an interface to be called from map-reduce jobs to output to an archive file in a map-reduce distributed file system.

A buffering database is used 303 as a temporary cache to buffer updates to the archive file.

A job index is provided 304 to buffer updates to an archive file for a job, and whereby the name of the index is a unique token assigned to the updating job.

A pending index is provided 305 to reference pending jobs at the buffering database. A committed index is provided 306 to reference committed jobs at the buffering database.

The archive manager handles 307 task reads from map-reduce jobs to read directly from an archive file or from a job index at the buffering database, and write to a job index at the buffering database used as a temporary cache to buffer updates.

The method includes outputting 308 updates from a job index to an archive file by serializing updates from the buffering database to the archive file.

An example implementation of the archive manager and the operations in its API is now described. The archive manager is referred to as the map-reduce buffering archive manager (MRBAM) library and defines the following operations in its API.

The first group of operations are performed by the map-reduce job at the start of the job (MRBAM_open) and when the job ends (MRBAM_commit and MRBAM_rollback).
 MRBAM_open—open the archive for writing.
 MRBAM_commit—commit changes to the archive file.
 MRBAM_rollback—rollback changes to the archive file.
The remaining calls can be issued by map-reduce tasks running within the job to read and write the archive while the job is running.
 MRBAM_read—read a key from an archive and return its value.
 MRBAM_write—write a key and value pair to the archive.
MRBAM maintains two indexes called MRBAM_PENDING and MRBAM_COMMITTED in the buffering database. These may be NoSQL indexes if the buffering database is a NoSQL database. Keys in these indexes are the distributed file system paths in the map-reduce system of the archive files. Values in these indexes contain a unique token that has been allocated by MRBAM to the job that has opened the archive file for writing. Every key-value pair in these indexes describes an MRBAM archive that is currently being updated.
 (Key=path to archive file, Value=unique token for job that has opened archive file for writing).
MRBAM_PENDING index (also referred to as simply the pending index) records all archive files containing uncommitted updates buffered in the buffering database.
MRBAM_COMMITTED index (also referred to as simply the committed index) records all archive files for which updates have been committed but not yet serialized to the archive file.

Figure 4A:
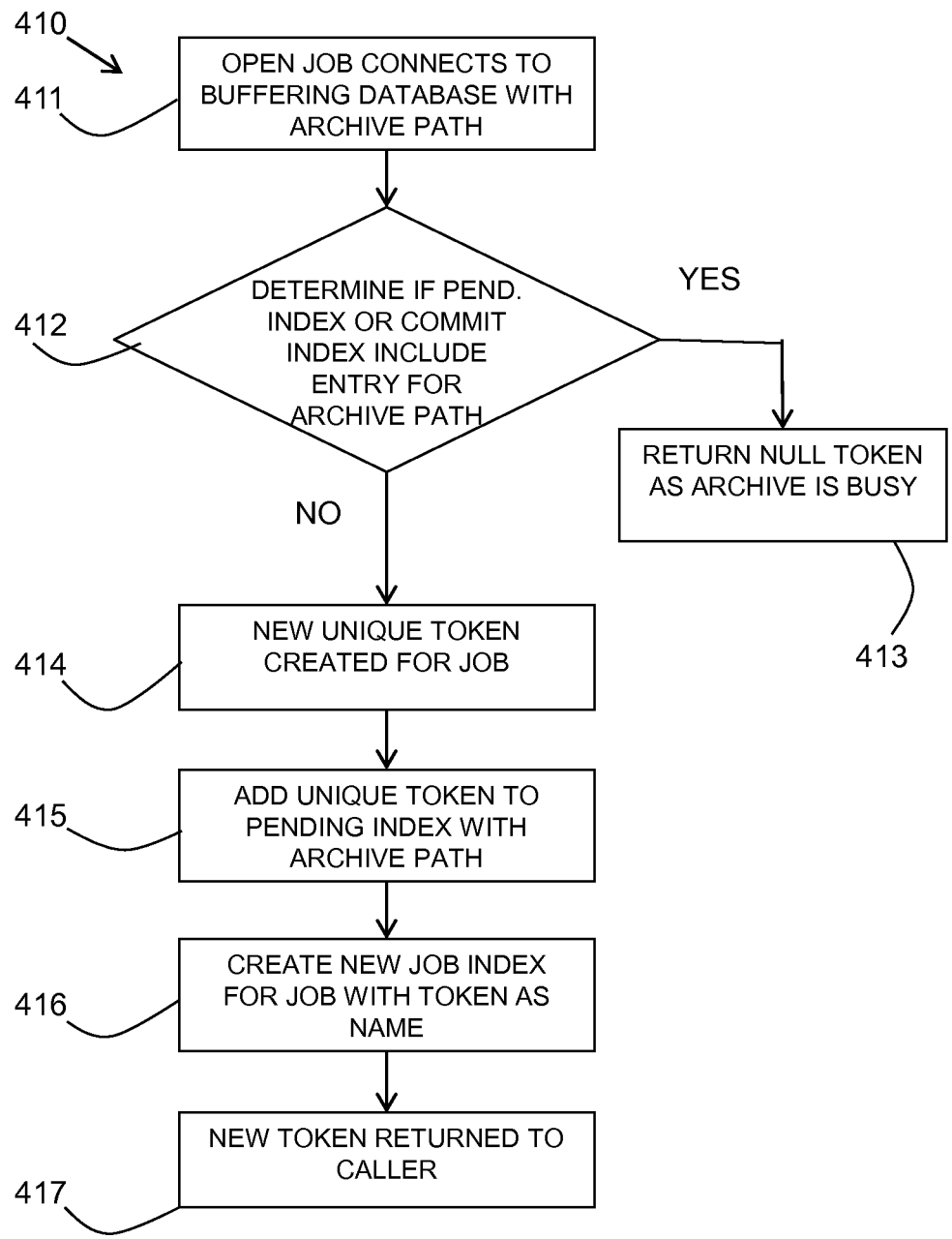
FIGS. 4A to 4C are flow diagrams of aspects of an example embodiment of a method in accordance with the present invention.
Figure 4B:
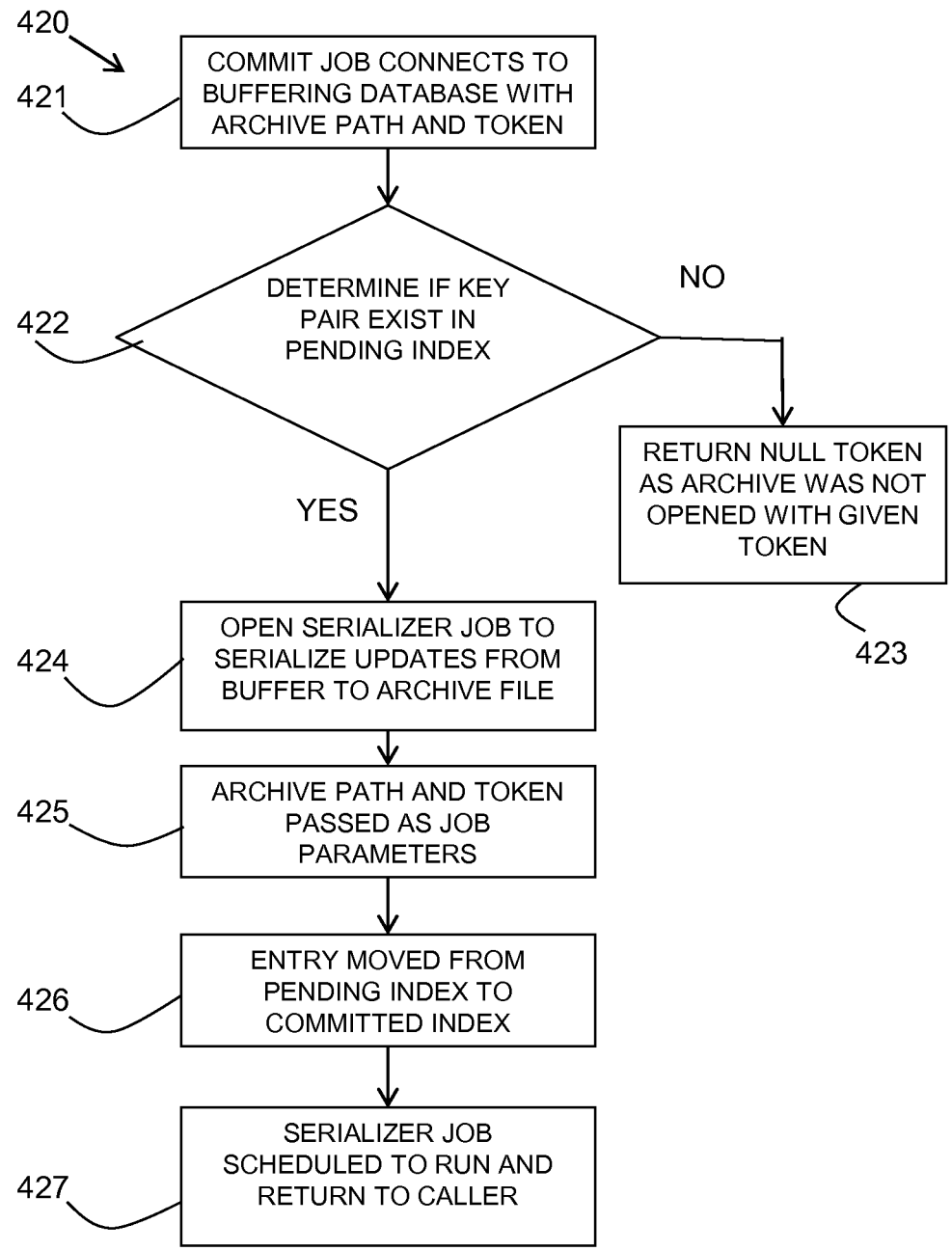
Figure 4C:
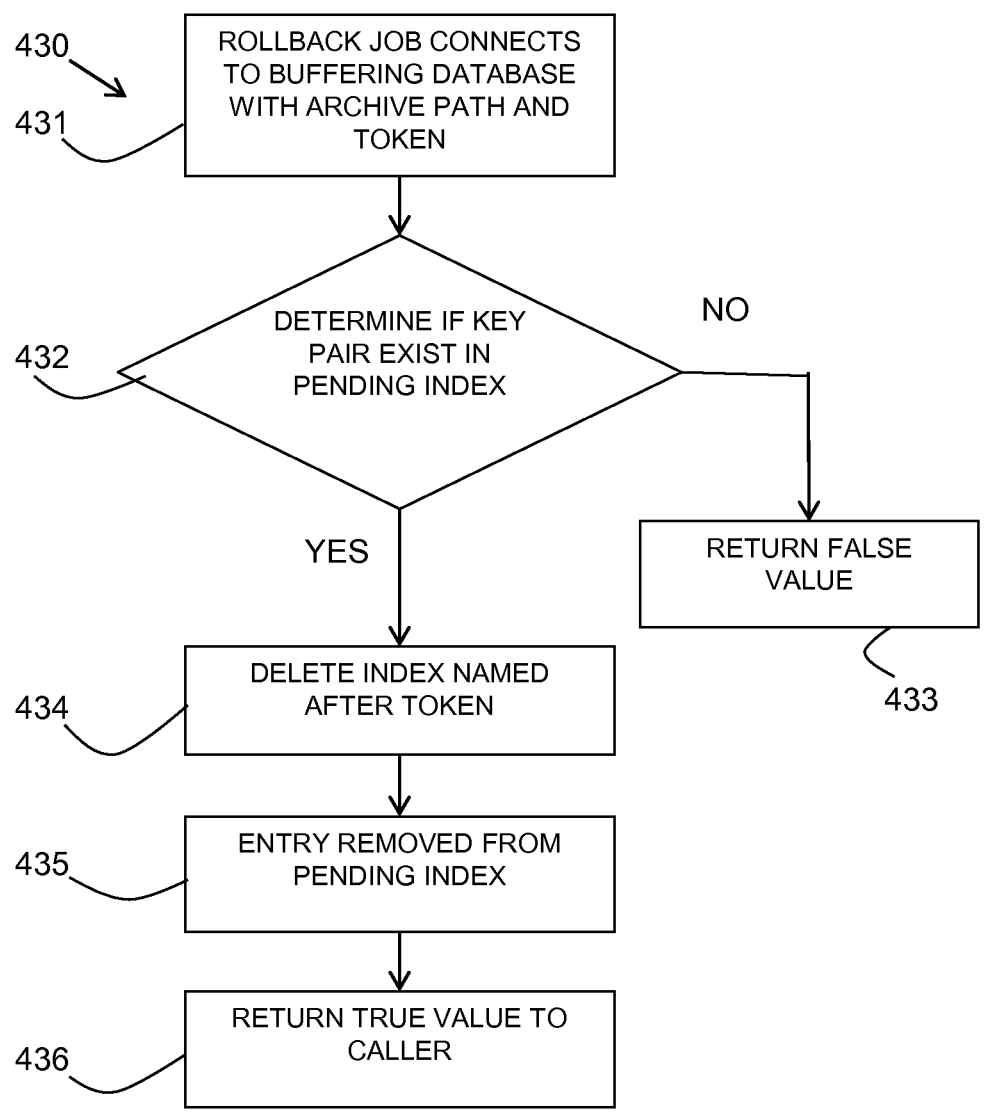
Figure 5B:
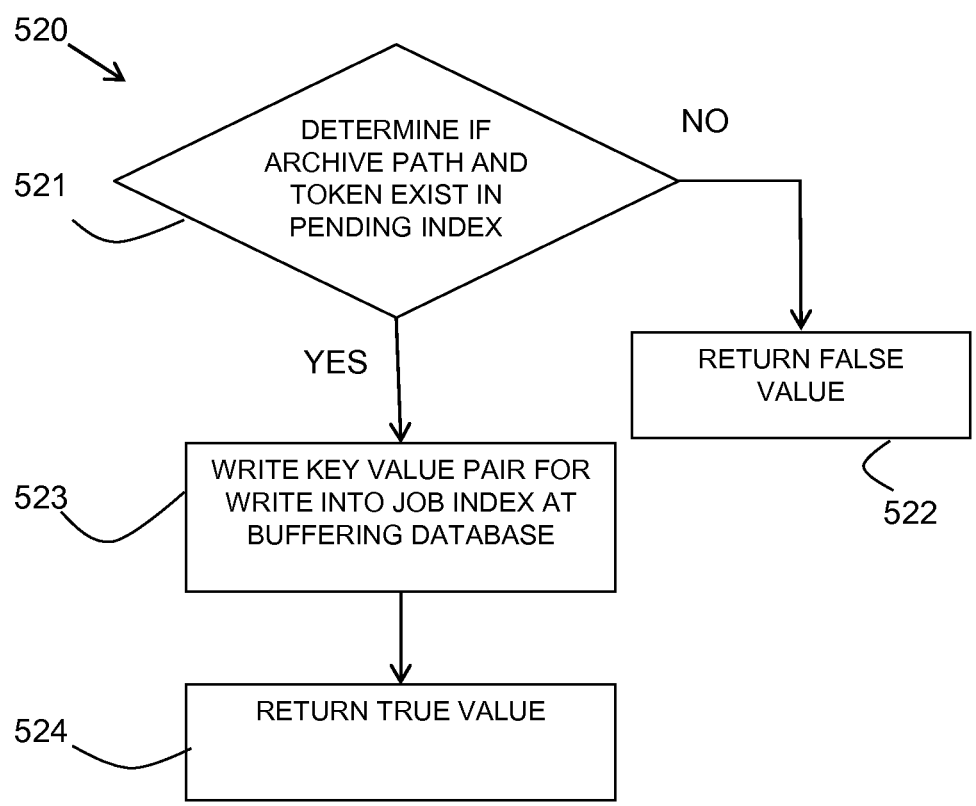

The MRBAM library implements each of its API calls as described with reference to the following flow diagrams. FIGS. 4A to 4C show the methods of the job operations of job open, job commit, job rollback. FIGS. 5A and 5B show the methods of the task operations of read and write.

Referring to FIG. 4A, the job open operation 410 MRBAM_open(archive_path) returns either a token or null.

The operation connects 411 to the buffering database for an open job with an archive path. It is determined 412 if the MRBAM_PENDING index or MRBAM_COMMITTED index at the buffering database already contains an entry for the archive_path parameter.

If it the indexes do already contain an entry for the archive_path parameter, a null token is returned 413 as the archive is already opened for writing by another job and cannot be opened.

If the indexes do not already contain an entry for the archive_path parameter, a new unique token is created 414 and an entry added 415 to MRBAM_PENDING index associating the archive_path with the token. This token must be passed to any subsequent call to the MRBAM_write operation to update the archive. It can also be optionally passed to a call to the MRBAM_read operation (if passed, it allows a read operation to return uncommitted updates written with this token).

A new job index is created in the buffering database 416 to buffer updates to this archive, using the token as the name of this index.

The new token is returned 417 to the caller.

Referring to FIG. 4B, the job commit operation 420.

MRBAM_commit(archive_path, token) returns either a job-id or null.

The commit job operation connects 421 to the buffering database with the archive path and the token for the job. It is determined 422 if the key-value pair for the job of (archive_path, token) exists in the MRBAM_PENDING index.

If it does not exist a null value is returned 423 as the archive was not opened for writing with the given access token.

If it does exist, a MRBAM_SERIALIZER job is opened 424 to serialize updates buffered in the buffering database to the archive file stored on the distributed file system. The archive_path and token are passed 425 as parameters to the job.

The (archive_path, token) pair are moved 426 from the MRBAM_PENDING index to the MRBAM_COMMITTED index.

The MRBAM_SERIALIZER job is scheduled 427 to run and return its job-id to the caller.

Referring to FIG. 4C, the job rollback operation 430 MRBAM_rollback(archive_path, token) returns Boolean.

The rollback operation connects 431 to the buffering database with the archive path and job token. It is determined 432 if the key-value pair of the job (archive_path, token) exists in the MRBAM_PENDING index.

If it does not exist, then the operation returns 433 a "false" value.

If the key-value pair does exist, the job index named after the supplied token is deleted 434.

The entry is removed 435 from the MRBAM_PENDING index with archive_path as the key value. A "true" value is returned 436.

Referring to FIG. 5A, the task read operation 510 MRBAM_read(archive_path, key, token) returns a value or null.

The value for the token may be null if the job does not have the archive opened for writing OR the job does have the archive opened for writing but does not want to read its own uncommitted writes.

It is determined 511 if the token is not null AND the connection to the buffering database can be made AND an entry exists in MRBAM_PENDING for archive_path with token as the value. If these criteria are met, the job index named after the token is opened 512 and the value for the key returned if the key is found in the job index.

It is determined 513 if a connection to the buffering database can be made AND an entry exists in MRBAM_COMMITTED for the archive_path. If these criteria are met, the token is retrieved from this entry, the job index named after the token is opened 514 and the value for the key returned if found in the job index.

It is determined 515 if the archive_path exists on the distributed file system. If it does exist AND the file contains the specified key, read 516 the value for the specified key from the file and return it to the caller.

If any of the above criteria are not met, return 517 a null value to the caller.

Referring to FIG. 5B, the task read operation 520 MRBAM_write(archive_path, key, value, token) returns Boolean.

A connection is made to the buffering database. It is determined 521 if the key-value pair of (archive_path, token) exists in the MRBAM_PENDING index. If it does not exist, return 522 a "false" value.

If it does exist, the key-value pair is written 523 into the buffering database job index named after the token and a "true" value is returned 524.

To remove an existing value from the archive file for a specified key, pass null as the value parameter to MRBAM_write.

Figure 6:
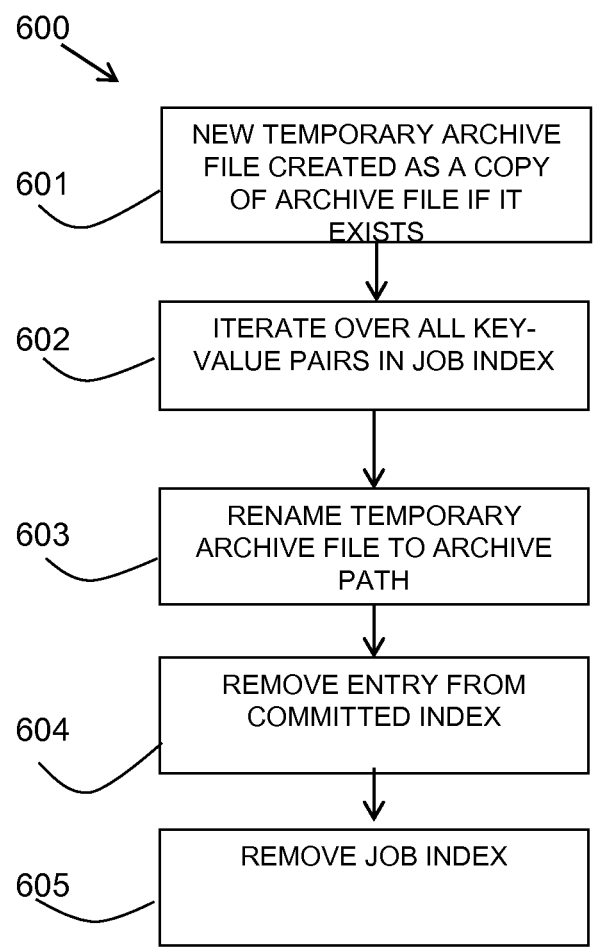
FIG. 6 is a flow diagram of a further aspect of an example embodiment of a method in accordance with the present invention.

Referring to FIG. 6, a flow diagram 600 shows a MRBAM_SERIALIZER job operation.

MRBAM_SERIALIZER is a job that runs a single mapper task, parameterized by the archive_path and token corresponding to the distributed file system path name of an archive name and name of the job index containing the updates to be made to the archive file. This task performs the following steps to write any committed updates buffered in the job index to the archive file:

A new temporary archive file is created 601 on the distributed file system as a copy of the file identified by archive_path if it exists. Otherwise create a new temporary empty archive file.

Iterate 602 over all key-value pairs in the job index named after the token. If the value is non-null, update the temporary archive file with each key-value pair. If the value is null, remove the key from the temporary archive file.

Rename 603 the temporary archive file to path archive_path.

Remove 604 the entry (archive_path,token) from the MRBAM_COMMITTED index.

Remove 605 the buffering database index named after the token.

Map-reduce jobs which update an archive file should be designed to avoid the following scenarios. The archive manager does not define behavior in these scenarios:

(1) writing the same key to the same archive from different map/reduce tasks;

(2) reading uncommitted updates to a key from one map/reduce task whilst writing the key from another.

The described method and system enables a portable archive file to be output for storing results of a map-reduce job enabling the archive file to be read by other applications. Irrespective of the data being processed, the outcome achieved by the described method and system is portability of results from map-reduce jobs using distributed file systems.

The described method and system control an API which is called from map-reduce jobs to read and write to an archive file.

Figure 7:
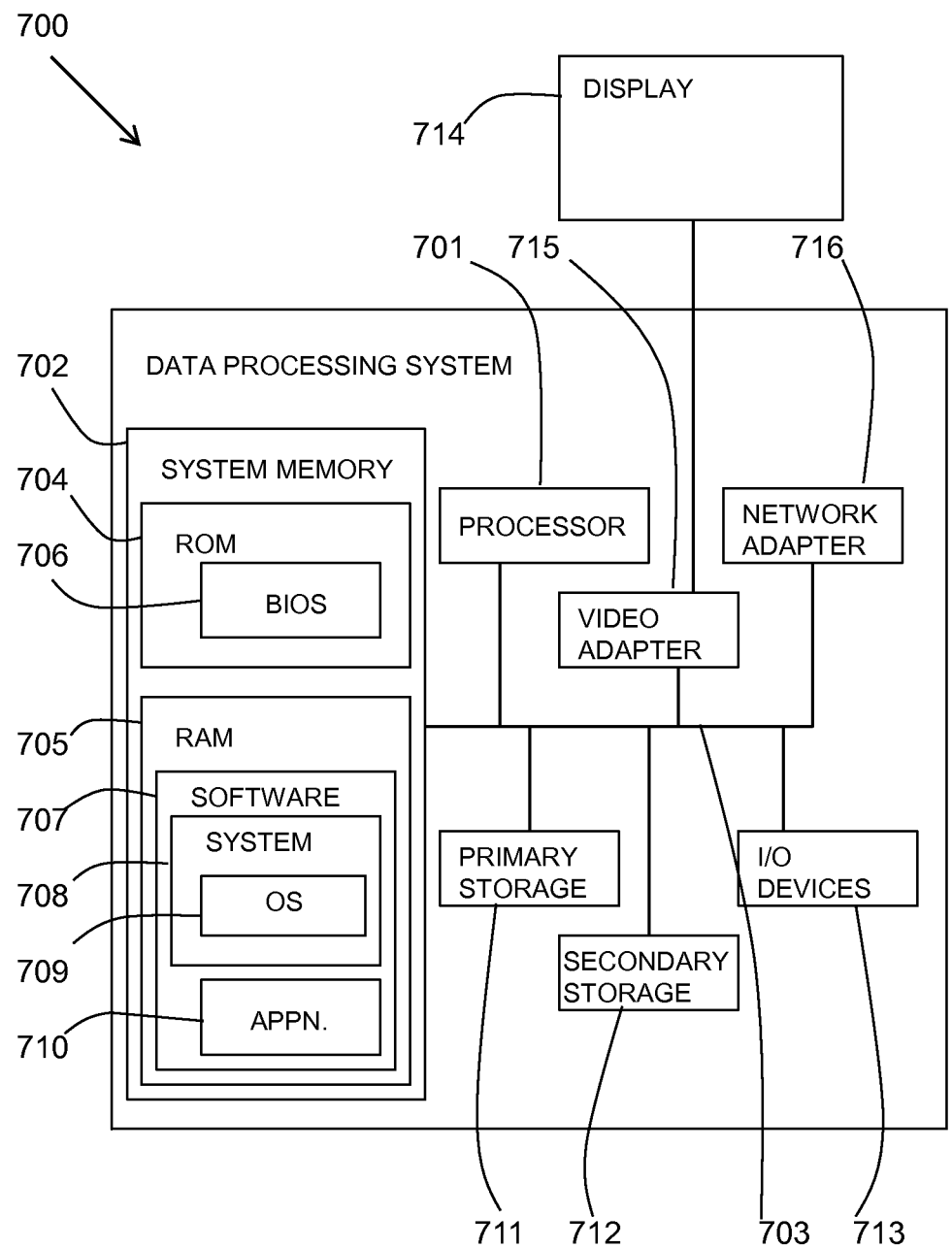
FIG. 7 is a block diagram of an embodiment of a computer system in which the present invention may be implemented.

Referring to FIG. 7, an exemplary system for implementing aspects of the invention includes a data processing system 700 suitable for storing and/or executing program code including at least one processor 701 coupled directly or indirectly to memory elements through a bus system 703. The memory elements may include local memory employed during actual execution of the program code, bulk storage, and cache memories which provide temporary storage of at least some program code in order to reduce the number of times code must be retrieved from bulk storage during execution.

The memory elements may include system memory 702 in the form of read only memory (ROM) 704 and random access memory (RAM) 705. A basic input/output system (BIOS) 706 may be stored in ROM 704. Software 707 may be stored in RAM 705 including system software 708 including operating system software 709. Software applications 710 may also be stored in RAM 705.

The system 700 may also include a primary storage means 711 such as a magnetic hard disk drive and secondary storage means 712 such as a magnetic disc drive and an optical disc drive. The drives and their associated computer-readable media provide non-volatile storage of computer-executable instructions, data structures, program modules and other data for the system 700. Software applications may be stored on the primary and secondary storage means 711, 712 as well as the system memory 702.

The computing system 700 may operate in a networked environment using logical connections to one or more remote computers via a network adapter 716.

Input/output devices 713 may be coupled to the system either directly or through intervening I/O controllers. A user may enter commands and information into the system 700 through input devices such as a keyboard, pointing device, or other input devices (for example, microphone, joy stick, game pad, satellite dish, scanner, or the like). Output devices may include speakers, printers, etc. A display device 714 is also connected to system bus 703 via an interface, such as video adapter 715.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of the present invention.

What is claimed is:

1. A processor-implemented method for outputting map-reduce jobs to an archive file, comprising:
providing, by a processor, an archive manager and exposing an interface to be called from map-reduce jobs to output to the archive file in a map-reduce distributed file system;
using a buffering database as a temporary cache to buffer updates to the archive file;
handling by the archive manager calls from map-reduce jobs to allow:
reading directly from the archive file or from a job index in the buffering database; and
writing to the job index in the buffering database used as a temporary cache to buffer the updates; outputting the updates from the job index to the archive file, wherein the archive file is a single, zip formatted file, and the updates are concurrently written to the archive file from a plurality of map-reduced tasks running within a single map-reduced job while the single map-reduced job is running; and
wherein handling by the archive manager calls from map-reduce jobs further comprises:
receiving a write call for a task of a map-reduce job;
connecting to the buffering database;
looking up a unique token for a map-reduce job at a pending index provided at the buffering database; and
writing to the job index provided at the buffering database.

2. The method as claimed in claim 1, wherein handling by the archive manager calls from map-reduce jobs further comprises:
receiving a read call for a task of a map-reduce job;
connecting to the buffering database;
looking up a unique token for the map-reduce job at a pending index and a committed index provided at the buffering database; and
depending on the status of the job, either reading from the archive file or reading from the job index provided at the buffering database.

3. The method as claimed in claim 1, wherein the archive manager manages access to the archive file, further comprises:
allowing only one map-reduce job to open the archive file for writing the updates at a time and committing the updates on completion of a job; and
allowing reading from the archive file by all jobs but without allowing reading of uncommitted writes.

4. The method as claimed in claim 1, further comprising:
maintaining a pending index at the buffering database to be accessed by a map-reduce job, wherein the pending index includes keys of archive file paths and values of unique tokens, wherein a unique token is allocated to a map-reduce job that has opened the archive file for writing; and
the pending index including entries for archive files containing uncommitted updates buffered in the buffering database.

5. The method as claimed in claim 1, further comprising:
maintaining a committed index at the buffering database to be accessed by a map-reduce job, wherein the committed index includes keys of archive file paths and values of unique tokens, wherein a unique token is allocated to a map-reduce job that has opened the archive file for writing; and
the committed index including entries for archive files for which updates have been committed but not yet serialized to the archive file.

6. The method as claimed in claim 1, further comprising:
serializing any committed updates buffered in the buffering database to the archive file, including mapping an archive file path name and the job index containing updates to the archive file.

7. The method as claimed in claim 1, wherein handling calls from map-reduce jobs by the archive manager includes a map-reduce job for opening the archive file for writing further comprises:
connecting to the buffering database;
creating a new unique token for the job and associating it with a path to the archive file; and
creating a job index at the buffering database for the archive file to buffer updates to the archive file.

8. The method as claimed in claim 1, wherein handling calls from map-reduce jobs by the archive manager includes a map-reduce job for committing changes to the archive file further comprises:
connecting to the buffering database;
creating a serializing job to serialize updates buffered in the job index at the buffering database, to the archive file; and
moving an entry for the archive path and unique job token to a committed index at the buffering database.

9. The method as claimed in claim 1, wherein handling calls from map-reduce jobs by the archive manager includes a map-reduce job for rollback of changes to an archive file further comprises:
connecting to the buffering database; and
removing an entry for the archive path and unique job token from a pending index at the buffering database.

10. A computer system for outputting map-reduce jobs to an archive file, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
an archive manager including an interface to be called from map-reduce jobs to output to the archive file in a map-reduce distributed file system;
a buffering database providing a temporary cache to buffer updates to the archive file;
wherein the archive manager handles calls from map-reduce jobs to:
read directly from the archive file or from a job index at the buffering database;
write to the job index at the buffering database used as a temporary cache to buffer the updates;
outputting the updates from the job index to the archive file, wherein the archive file is a single, zip formatted file, and the updates are concurrently written to the archive file from a plurality of map-reduced tasks running within a single map-reduced job while the single map-reduced job is running; and wherein handling by the archive manager calls from map-reduce jobs further comprises:
receiving a write call for a task of a map-reduce job;
connecting to the buffering database;
looking up a unique token for a map-reduce job at a pending index provided at the buffering database; and
writing to the job index provided at the buffering database.

11. The system as claimed in claim 10, wherein the buffering database includes the job index to buffer updates to the archive file for a job, and wherein the name of the job index is a unique token of an updating job.

12. The system as claimed in claim 10, further comprising:
maintaining a pending index at the buffering database to be accessed by a map-reduce job, wherein the pending index includes keys of archive file paths and values of unique tokens, wherein a unique token is allocated to a map-reduce job that has opened the archive file for writing; and
the pending index including entries for archive files containing uncommitted updates buffered in the buffering database.

13. The system as claimed in claim 10 further comprising:
maintaining a committed index at the buffering database to be accessed by a map-reduce job, wherein the committed index includes keys of archive file paths and values of unique tokens, wherein a unique token is allocated to a map-reduce job that has opened the archive file for writing; and
the committed index including entries for archive files for which updates have been committed but not yet serialized to the archive file.

14. The system as claimed in claim 10, further comprising:
serializing any committed updates buffered in the buffering database to the archive file, including mapping an archive file path name and the job index containing updates to the archive file.

15. A computer program stored on a non-transitory computer readable medium and loadable into the internal memory of a digital computer, comprising software code portions, when said program is run on a computer, for performing a method for outputting map-reduce jobs to an archive file comprising:
program instructions to provide an archive manager and expose an interface to be called from map-reduce jobs to output to the archive file in a map-reduce distributed file system;
program instructions to use a buffering database as a temporary cache to buffer updates to the archive file;
program instructions to handle by the archive manager calls from map-reduce jobs to allow:
program instructions to read directly from the archive file or from a job index in the buffering database; and
program instructions to write to the job index in the buffering database used as a temporary cache to buffer the updates;
program instructions to output the updates from the job index to the archive file, wherein the archive file is a single, zip formatted file, and the updates are concurrently written to the archive file from a plurality of map-reduced tasks running within a single map-reduced job while the single map-reduced job is running; and
wherein handling by the archive manager calls from map-reduce jobs further comprises:
program instructions to receive a write call for a task of a map-reduce job;
program instructions to connect to the buffering database;
program instructions to look up a unique token for a map-reduce job at a pending index provided at the buffering database; and
program instructions to write to the job index provided at the buffering database.

16. The computer program as claimed in claim 15, wherein handling by the archive manager calls from map-reduce jobs further comprises:
program instructions to receive a read call for a task of a map-reduce job;
program instructions to connect to the buffering database;
program instructions to look up a unique token for the map-reduce job at a pending index and a committed index provided at the buffering database; and
depending on the status of the job, program instructions to either reading from the archive file or read from the job index provided at the buffering database.

17. The computer program as claimed in claim 15, wherein the archive manager manages access to the archive file, further comprises:
program instructions to allow only one map-reduce job to open the archive file for writing the updates at a time and committing the updates on completion of a job; and
program instructions to allow reading from the archive file by all jobs but without allowing reading of uncommitted writes.

18. The computer program as claimed in claim 15, further comprising:
program instructions to maintain a pending index at the buffering database to be accessed by a map-reduce job, wherein the pending index includes keys of archive file paths and values of unique tokens,
wherein a unique token is allocated to a map-reduce job that has opened the archive file for writing; and
the pending index including entries for archive files containing uncommitted updates buffered in the buffering database.

* * * * *